Patented July 8, 1952

2,602,756

UNITED STATES PATENT OFFICE 2,602,756

NONFLOCCULATING, NONSTRIATING NITROCELLULOSE LACQUER

Robert Tyler Hucks, South River, N. J., assignor to E. I. du Pont de Nemours & Company, Wilmington, Del., a corporation of Delaware No Drawing. Application September 23, 1948, Serial No. 50,881

5 Claims. (Cl. 106—193)

This invention relates to cellulose nitrate coating compositions and, more particularly, to phthalocyanine pigmented cellulose nitrate coating compositions or lacquers which are free from flocculation and striation or separation.

The tendency of phthalocyanine pigments (generally known as "Monastral Blues and Greens") to flocculate and separate out of lacquer compositions, on standing for as short a time as one or two hours, has retarded their use in lacquers, because the films produced thereby present an undesirable mottled appearance. Storage over long periods results in progressively greater flocculation and separation until the composition is ultimately a striation of two or more colored lacquer layers. This condition is particularly pronounced in the light shades of blue where tints are produced by blending phthalocyanine blue pigments with a white pigment, such as titanium dioxide.

Phthalocyanine pigments, in combination with other pigments, yield numerous pleasing and desirable shades and tints possessing outstanding outdoor durability in comparison with other types of blue and green pigments, but the flocculation and settling is particularly objectionable in the automotive finishing and refinishing industry where colors are matched within narrow tolerance limits and refinish lacquers are formulated to match, without further color doping, the original finish. Such lacquers may be in shelf storage for periods of six months or more, during which time prior phthalocyanine pigmented striate to such an extent that it is difficult to restore the initial color.

In order to overcome this latter condition, it has heretofore been the practice to subject the thinned lacquer to continuous circulation and agitation, but this requires the installation and maintenance of expensive equipment. Attempts have been made to prevent flocculation by the addition of surface-active wetting and dispersing agents, but these have failed to produce the desired results in phthalocyanine pigmented cellulose nitrate coating compositions. Alteration of the pH of the composition by incorporating either acidic or basic constituents also failed in this respect. Similarly, no improvement was attained by coating the phthalocyanine pigment particles, during dispersing operations, with a minute layer of a polymeric resin, such as a vinyl derivative.

It is therefore an object of this invention to produce an improved phthalocyanine pigmented lacquer coating composition. It is another object to produce an improved phthalocyanine pigmented lacquer coating composition which is free from flocculation and separation of the pigment and resulting striation. It is an additional object to produce a phthalocyanine pigmented lacquer coating composition which will retain uniform color characteristics in the wet state. It is a further object to produce a phthalocyanine pigmented lacquer film which is free from flooding and resulting "off-color" conditions from coat to coat of the applied lacquer. It is a still further object to provide an improved process of producing phthalocyanine pigmented lacquer coating compositions.

These objects, and others which will be apparent as the description proceeds, are accomplished by incorporating in a phthalocyanine pigmented cellulose nitrate lacquer composition a small amount of a cellulose derivative anti-flocculating agent selected from the group consisting of ethyl cellulose, methyl cellulose, and dynamite cellulose nitrate. For reasons pointed out below, ethyl cellulose is the preferred cellulose derivative anti-flocculating agent.

The anti-flocculating agent may be incorporated in the composition in any suitable manner or at any stage of manufacture. For example, it may be mixed with the phthalocyanine pigment in the dispersion stage, or it may be mixed with another pigment dispersion which is then added to the phthalocyanine pigmented lacquer as a tinting agent. Furthermore, it may be added to either the phthalocyanine pigmented lacquer or the other lacquers used to tint the final product. However, when ethyl cellulose is used as the anti-flocculating agent, it is preferred to add it to the lacquer in the final mixing stage; i. e., when the various tinting lacquers are mixed together. This last method is preferred because of the ready control over the amount of agent to be added to the product and the independence of the agent from the pigment dispersion intermediate or the individual tinting enamel.

The following examples illustrate embodiments of this invention, the parts being by weight.

EXAMPLE 1

This example shows ethyl cellulose added to the final lacquer.

Phthalocyanine blue pigment, a pure toner copper phthalocyanine, was dispersed in the form of a pigmented intermediate, using the "pulp process" described in United States Patent No. 2,140,745.

Phthalocyanine pigmented intermediate

| | Parts |
|---|---|
| Cellulose nitrate | 48.7 |
| Phthalocyanine blue pigment | 24.4 |
| Blown castor oil | 10.8 |
| Dibutyl phthalate | 16.1 |
| | 100.0 |

The composition of the intermediate is shown on a dry basis; i. e., not including the fractional amount of water retained after processing by the "pulp process."

The cellulose nitrate was the regular lacquer variety having a viscosity of about ¼ second, which is equivalent to 4–5 seconds at 25° C. for Formula C of A. S. T. M. Method D–301–33.

16.4 parts of the above intermediate were let down (i. e., formulated) with additional vehicle to the following composition:

Phthalocyanine tinting lacquer

| | Parts |
|---|---|
| Cellulose nitrate (dry) | 15.9 |
| Alkyd Resin A (solids) | 6.6 |
| Dibutyl phthalate | 4.8 |
| Blown castor oil | 3.2 |
| Phthalocyanine blue pigment | 4.0 |
| Malic acid | 0.3 |
| Dehydration alcohol | 8.6 |
| Butyl acetate | 15.5 |
| Butyl alcohol | 3.5 |
| Methyl ethyl ketone | 13.6 |
| Methyl isobutyl ketone | 3.7 |
| Methyl isobutyl carbinol | 2.1 |
| Petroleum naphtha | 3.0 |
| Petroleum xylol | 3.7 |
| Toluene | 11.5 |
| | 100.0 |

Alkyd Resin A was a 45% hydrogenated castor oil modified glycerol phthalate resin, having an acid number of 45–55, cut to 60% solids in toluene.

A white lacquer intermediate was prepared by dispersing titanium dioxide pigment in a viscous cellulose nitrate base, using a Werner and Pfleiderer mixer as described in United States Patent No. 2,052,470, and was then let down with additional vehicle to the following composition:

Titanium dioxide tinting lacquer

| | Parts |
|---|---|
| Cellulose nitrate (dry) | 15.3 |
| Alkyd Resin A (solids) | 13.8 |
| Dibutyl phthalate | 2.3 |
| Blown castor oil | 1.5 |
| Titanium dioxide pigment | 7.0 |
| Malic acid | 0.3 |
| Dehydration alcohol | 8.3 |
| Butyl acetate | 20.0 |
| Butyl alcohol | 1.0 |
| Methyl ethyl ketone | 6.4 |
| Methyl isobutyl ketone | 3.3 |
| Methyl isobutyl carbinol | 2.0 |
| Petroleum xylol | 3.3 |
| Toluene | 15.5 |
| | 100.0 |

The vehicle components were identical with those used in the blue tinting lacquer.

The following solution was prepared:

Ethyl cellulose solution A

| | Parts |
|---|---|
| Methyl ethyl ketone | 10 |
| Butyl acetate | 10 |
| Toluene | 50 |
| Denatured ethyl alcohol 23A | 20 |
| Ethyl cellulose | 10 |
| | 100 |

The ethyl cellulose was characterized by a low ethoxyl content (43–45%) and a viscosity of 50 centipoises for a 5% solution in a mixed solvent containing 70 parts of toluene and 30 parts of ethyl alcohol.

The final phthalocyanine pigmented lacquer was then prepared as follows:

Final composition

| | Parts |
|---|---|
| Phthalocyanine tinting lacquer | 19 |
| Titanimum dioxide tinting lacquer | 76 |
| Ethyl cellulose solution A (10%) | 5 |
| | 100 |

Add and mix until uniform.

The resulting product, containing 0.5% of ethyl cellulose, showed no flocculation or striation during six months of shelf storage. A lacquer made up of the same ingredients, but containing no ethyl cellulose, showed flocculation after 3 hours and striation was detectable after 16 hours' (or overnight) storage.

EXAMPLE 2

| | Parts |
|---|---|
| Phthalocyanine tinting lacquer of Example 1 | 85.5 |
| Titanium dioxide tinting lacquer of Example 1 | 9.5 |
| Ethyl cellulose solution A (10%) | 5.0 |
| | 100.0 |

This composition showed no flocculation or striation during six months of shelf storage.

EXAMPLE 3

| | Parts |
|---|---|
| Phthalocyanine tinting lacquer of Example 1 | 4.75 |
| Titanium dioxide tinting lacquer of Example 1 | 90.25 |
| Ethyl cellulose solution A (10%) | 5.00 |
| | 100.00 |

This composition showed no flocculation or striation during six months of shelf storage.

The above three examples show clearly that the optimum content of 0.5% of ethyl cellulose is effective over the wide range of phthalocyanine pigmentation generally found in lacquer products.

EXAMPLE 4

This example shows ethyl cellulose added to the titanium dioxide pigmented intermediate before it is let down to the titanium dioxide tinting lacquer which is finally mixed with a phthalocyanine tinting lacquer.

Titanium dioxide was dispersed in the form of a pigmented intermediate containing ethyl cellulose, using the method described in United States Patent No. 2,052,470.

*Titanium dioxide pigmented intermediate*

| | Parts |
|---|---|
| Cellulose nitrate | 6.8 |
| Titanium dioxide pigment | 45.0 |
| Ethyl cellulose (50 cps.—low ethoxyl) | 4.5 |
| Dehydration alcohol | 3.2 |
| Methyl isobutyl ketone | 9.7 |
| Butyl acetate | 30.8 |
| | 100.0 |

15.6 parts of the above intermediate were let down with additional vehicle to the following composition:

*Titanium dioxide tinting lacquer*

| | Parts |
|---|---|
| Cellulose nitrate (dry) | 15.4 |
| Alkyd Resin A (solids) | 13.8 |
| Dibutyl phthalate | 2.3 |
| Blown castor oil | 1.5 |
| Titanium dioxide pigment | 7.0 |
| Ethyl cellulose (50 cps.—low ethoxyl) | 0.7 |
| Malic acid | 0.3 |
| Dehydration alcohol | 8.3 |
| Butyl acetate | 20.0 |
| Butyl alcohol | 1.0 |
| Methyl ethyl ketone | 6.4 |
| Methyl isobutyl ketone | 3.3 |
| Methyl isobutyl carbinol | 2.0 |
| Petroleum xylol | 3.3 |
| Toluene | 14.7 |
| | 100.0 |

The final lacquer was then prepared as follows:

*Final composition*

| | Parts |
|---|---|
| Phthalocyanine tinting lacquer of Example 1 | 20 |
| Titanium dioxide tinting lacquer as prepared above | 80 |
| | 100 |

It contained 0.56% of ethyl cellulose.

EXAMPLE 5

Another lacquer was prepared, using the same tinting lacquers described in Example 4, but having the following composition:

*Final composition*

| | Parts |
|---|---|
| Phthalocyanine tinting lacquer of Example 1 | 70 |
| Titanium dioxide tinting lacquer of Example 4 | 30 |
| | 100 |

It contained 0.21% of ethyl cellulose.

EXAMPLE 6

This example shows ethyl cellulose added to the phthalocyanine pigmented intermediate before it is let down to the phthalocyanine tinting lacquer which is finally mixed with a titanium dioxide tinting lacquer.

Phthalocyanine blue pigment, a pure toner copper phthalocyanine, was dispersed in a ball mill in the form of a pigmented intermediate containing ethyl cellulose.

*Phthalocyanine pigmented intermediate*

| | Parts |
|---|---|
| Alkyd Resin A (solids) | 15.6 |
| Cellulose nitrate | 4.2 |
| Phthalocyanine blue pigment (dry) | 9.5 |
| Ethyl cellulose (50 cps.—low ethoxyl) | 2.8 |
| Dehydration alcohol | 1.8 |
| Lacquer solvents | 46.1 |
| High solvency hydrocarbon diluents | 20.0 |
| | 100.0 |

42.3 parts of the above intermediate were let down with additional vehicle to the following composition:

*Phthalocyanine tinting lacquer*

| | Parts |
|---|---|
| Cellulose nitrate (dry) | 15.9 |
| Alkyd Resin A (solids) | 6.6 |
| Dibutyl phthalate | 4.8 |
| Blown castor oil | 3.2 |
| Phthalocyanine blue pigment | 4.0 |
| Ethyl cellulose (50 cps.—low ethoxyl) | 1.2 |
| Malic acid | 0.3 |
| Dehydration alcohol | 8.6 |
| Butyl acetate | 14.3 |
| Butyl alcohol | 3.5 |
| Methyl ethyl ketone | 13.6 |
| Methyl isobutyl ketone | 3.7 |
| Methyl isobutyl carbinol | 2.1 |
| Petroleum naphtha | 3.0 |
| Petroleum xylol | 3.7 |
| Toluene | 11.5 |
| | 100.0 |

The final lacquer was then prepared as follows:

*Final composition*

| | Parts |
|---|---|
| Phthalocyanine tinting lacquer of this example | 20 |
| Titanium dioxide tinting lacquer of Example 1 | 80 |
| | 100 |

It contained 0.24% of ethyl cellulose.

EXAMPLE 7

A lacquer was prepared, using the same tinting lacquers described in Example 6, but having the following composition:

*Final composition*

| | Parts |
|---|---|
| Phthalocyanine tinting lacquer of Example 6 | 70 |
| Titanium dioxide tinting lacquer of Example 1 | 30 |
| | 100 |

It contained 0.84% of ethyl cellulose.

EXAMPLE 8

In this example, ethyl cellulose was added directly as an integral part of the titanium dioxide tinting lacquer, as distinguished from addition to the dispersion stage.

*Titanium dioxide tinting lacquer*

| | Parts |
|---|---|
| Cellulose nitrate (dry) | 15.4 |
| Alkyd Resin A (solids) | 13.8 |
| Dibutyl phthalate | 2.3 |
| Blown castor oil | 1.5 |
| Titanium dioxide pigment | 7.0 |
| Ethyl cellulose (50 cps.—low ethoxyl) | 0.7 |
| Malic acid | 0.3 |
| Dehydration alcohol | 8.3 |
| Butyl acetate | 20.0 |
| Butyl alcohol | 1.0 |
| Methyl ethyl ketone | 6.4 |
| Methyl isobutyl ketone | 3.3 |
| Methyl isobutyl carbinol | 2.0 |
| Petroleum xylol | 3.3 |
| Toluene | 14.7 |
| | 100.0 |

The final lacquer composition, containing 0.56% ethyl cellulose, was prepared by mixing 80 parts of this titanium dioxide tinting lacquer with 20 parts of the phthalocyanine tinting lacquer of Example 1.

EXAMPLE 9

In this example, ethyl cellulose was added directly as an integral part of the phthalocyanine tinting lacquer.

*Phthalocyanine tinting lacquer*

| | Parts |
|---|---|
| Cellulose nitrate (dry) | 15.9 |
| Alkyd Resin A (solids) | 6.6 |
| Dibutyl phthalate | 4.8 |
| Blown castor oil | 3.2 |
| Phthalocyanine blue pigment | 4.0 |
| Ethyl cellulose (50 cps.—low ethoxyl) | 1.2 |
| Malic acid | 0.3 |
| Dehydration alcohol | 8.6 |
| Butyl acetate | 14.3 |
| Butyl alcohol | 3.5 |
| Methyl ethyl ketone | 13.6 |
| Methyl isobutyl ketone | 3.7 |
| Methyl isobutyl carbinol | 2.1 |
| Petroleum naphtha | 3.0 |
| Petroleum xylol | 3.7 |
| Toluene | 11.5 |
| | 100.0 |

The final lacquer composition, containing 0.6% ethyl cellulose, was prepared by mixing 50 parts of this phthalocyanine tinting lacquer with 50 parts of the titanium dioxide tinting lacquer of Example 1.

EXAMPLE 10

*Ethyl cellulose solution B*

| | Parts |
|---|---|
| Toluene | 72 |
| Denatured alcohol | 18 |
| Ethyl cellulose (400 cps.—high ethoxyl) | 10 |
| | 100 |

When this solution B was mixed with the tinting lacquers, as described in Example 1, the resulting product contained 0.5% ethyl cellulose.

EXAMPLE 11

*Ethyl cellulose solution C*

| | Parts |
|---|---|
| Toluene | 72 |
| Denatured alcohol | 18 |
| Ethyl cellulose (100 cps.—medium ethoxyl) | 10 |
| | 100 |

When this solution C was mixed with the tinting lacquers, as described in Example 1, the resulting product contained 0.5% ethyl cellulose.

EXAMPLE 12

A chlorinated phthalocyanine green pigment was dispersed in the pulp form to yield a pigmented intermediate having the following composition:

*Phthalocyanine pigmented intermediate*

| | Parts |
|---|---|
| Cellulose nitrate (dry) | 45.5 |
| Phthalocyanine green pigment | 31.9 |
| Blown castor oil | 9.3 |
| Dibutyl phthalate | 13.3 |
| | 100.0 |

As in Example 1, the composition of this intermediate is shown on a dry basis.

15.6 parts of this intermediate were let down with additional vehicle to the following composition:

*Phthalocyanine tinting lacquer*

| | Parts |
|---|---|
| Cellulose nitrate (dry) | 16.0 |
| Alkyd Resin B (solid) | 6.4 |
| Dibutyl phthalate | 4.8 |
| Blown castor oil | 3.2 |
| Malic acid | 0.3 |
| Phthalocyanine green pigment | 5.0 |
| Volatile lacquer solvents and diluents | 64.3 |
| | 100.0 |

Alkyd Resin B was a 50% coconut oil modified glycerol phthalate resin having an acid number of 3, cut to 70% solids in toluene.

The volatile lacquer solvents and diluents were equivalent to those specifically shown in the tinting compositions of Example 1 with the solvents and non-solvents in the same relative proportion.

The final phthalocyanine green pigmented lacquer was then prepared as follows:

*Final composition*

| | Parts |
|---|---|
| Phthalocyanine tinting lacquer | 19 |
| Titanium dioxide tinting lacquer of Example 1 | 76 |
| Ethyl cellulose solution A (10%) | 5 |
| | 100 |

This composition contained 0.5% of ethyl cellulose.

EXAMPLE 13

A phthalocyanine blue pigment was dispersed in a ball mill in the form of a pigmented intermediate as follows:

Phthalocyanine pigmented intermediate

| | Parts |
|---|---|
| Ester gum | 7.8 |
| Dewaxed damar solution | 17.8 |
| Phthalocyanine blue pigment (dry) | 14.7 |
| Methyl ethyl ketone | 25.0 |
| High solvency petroleum naphtha | 25.8 |
| Butyl alcohol | 8.9 |
| | 100.0 |

The dewaxed damar solution used in this intermediate was of the following composition:

| | Parts |
|---|---|
| Damar | 44 |
| Ethyl alcohol | 35 |
| High solvency petroleum naphtha | 21 |
| | 100 |

27.2 parts of this intermediate were let down with additional vehicle to the following composition:

Phthalocyanine tinting lacquer

| | Parts |
|---|---|
| Cellulose nitrate | 17.0 |
| Ester gum | 2.1 |
| Damar (solid) | 2.1 |
| Dibutyl phthalate | 5.3 |
| Blown castor oil | 3.4 |
| Citric acid | 0.3 |
| Phthalocyanine blue pigment | 4.0 |
| Ethyl cellulose (50 cps.—low ethoxyl) | 1.2 |
| Dehydration alcohol | 9.2 |
| Butyl acetate | 25.7 |
| Butyl alcohol | 2.4 |
| Methyl ethyl ketone | 11.3 |
| Ethyl alcohol | 1.7 |
| High solvency petroleum naphtha | 14.3 |
| | 100.0 |

A white tinting lacquer was prepared having the following composition:

Titanium dioxide tinting lacquer

| | Parts |
|---|---|
| Cellulose nitrate | 17.5 |
| Ester gum | 2.2 |
| Dewaxed damar | 2.2 |
| Dibutyl phthalate | 5.4 |
| Blown castor oil | 3.5 |
| Titanium dioxide | 7.0 |
| Dehydration ethyl alcohol | 9.5 |
| Butyl acetate | 12.0 |
| Amyl acetate | 2.7 |
| Methyl ethyl ketone | 17.0 |
| Butyl alcohol | 3.0 |
| High solvency naphtha | 16.0 |
| Xylene | 2.0 |
| | 100.0 |

The final lacquer was then prepared as follows:

Final composition

| | Parts |
|---|---|
| Phthalocyanine tinting lacquer | 20 |
| Titanium dioxide tinting lacquer | 80 |
| | 100 |

It contained 0.24% of ethyl cellulose.

All of the above examples produced lacquers in which the phthalocyanine pigments did not flocculate or separate, and no striation occurred during prolonged storage (6 month or more).

EXAMPLE 14

This example shows methyl cellulose added to a titanium dioxide pigmented intermediate before it is let down to the titanium dioxide tinting lacquer which is finally mixed with a phthalocyanine tinting lacquer.

Methyl cellulose is essentially insoluble in lacquer solvents, but it is readily dispersible in water. Therefore, it was preferred to add the methyl cellulose under conditions where the aqueous dispersion can be tolerated, i. e., in the "pulp process" method described in U. S. Patent 2,140,745.

Titanium Dioxide pigmented intermediate

| | Parts |
|---|---|
| Cellulose nitrate (dry) | 56.13 |
| Methyl cellulose (100 cps.) (10% aqueous solution) | 1.07 |
| Titanium dioxide | 21.40 |
| Blown castor oil | 6.40 |
| Dibutyl phthalate | 15.00 |
| | 100.00 |

The composition of the intermediate is shown on a dry basis; i. e., not including the fractional amount of water retained after processing by the "pulp process."

The methyl cellulose was present on the basis of 5% of the pigment content. The viscosity of the methyl cellulose was based on a 2% solution in water at 20° C.

32.7 parts of the above intermediate were let down with additional vehicle to the following composition:

Titanium dioxide tinting lacquer

| | Parts |
|---|---|
| Cellulose nitrate (dry) | 15.40 |
| Alkyd Resin A (solids) | 13.80 |
| Dibutyl phthalate | 2.30 |
| Blown castor oil | 1.50 |
| Titanium dioxide pigment | 7.00 |
| Methyl cellulose (100 cps.) | 0.35 |
| Maleic acid | 0.30 |
| Dehydration alcohol | 8.30 |
| Butyl acetate | 20.00 |
| Butyl alcohol | 1.00 |
| Methyl ethyl ketone | 6.40 |
| Methyl isobutyl ketone | 3.30 |
| Methyl isobutyl carbinol | 2.00 |
| Petroleum xylol | 3.30 |
| Toluene | 15.05 |
| | 100.00 |

The final lacquer was then prepared as follows:

Final composition

| | Parts |
|---|---|
| Phthalocyanine tinting lacquer of Example 1 | 20 |
| Titanium dioxide tinting lacquer as prepared above | 80 |
| | 100 |

It contained 0.28% of methyl cellulose and showed no signs of flocculation during 5 days' storage.

EXAMPLE 15

The term "dynamite cellulose nitrate" is intended to mean the type of cellulose nitrate commonly used for explosives. It is characterized by a nitrogen content usually between about 12.15% and 12.35%, an extremely high viscosity (40 to 200 seconds in a 3% solution in acetone using the method described in A. S. T. M. D-301-33), and its gel structure in suitable solvents. It differs from low viscosity or even so-called 1000 seconds viscosity cellulose nitrate by its gel structure or false body characteristic and by the lack of any intentional treatment in its manufacture to reduce its viscosity characteristic. It will be noted that care is taken in the manufacture of dynamite cellulose nitrate to avoid any substantial reduction in viscosity characteristic or destruction of gel structure property of the cellulose or cellulose nitrate.

Dynamite cellulose nitrate was directly substituted for the ethyl cellulose shown in the composition of Example 4. It was characterized by having a nitrogen content of 12.16% and a viscosity of 145 seconds.

A lacquer was prepared as follows:

*Final composition*

| | Parts |
|---|---|
| Phthalocyanine tinting lacquer of Example 1 | 20 |
| Titanium dioxide tinting lacquer of Example 4 except dynamite cellulose nitrate was substituted for the ethyl cellulose | 80 |
| | 100 |

It contained 0.56% of dynamite cellulose nitrate and showed no signs of flocculation during 68 hours' storage, and no separation was evident during 188 hours' storage.

Although resistance to flocculation and striation was not at a preferred level with either the methyl cellulose (Example 14) or the dynamite cellulose nitrate (Example 15), in comparison with the ethyl cellulose, those ingredients did provide significant improvement in overcoming the undesirable flocculation and striation tendencies of the phthalocyanine pigmented lacquers.

When the content of anti-flocculating agent is less than 0.2%, based on the weight of the total composition, its effectiveness is greatly decreased. For instance, it was found that when the ethyl cellulose content of Example 4 was reduced to 0.18%, flocculation occurred at about 4 days' storage; when it was further reduced to 0.15%, flocculation occurred at about 41 hours.

The results obtained in the above examples therefore show that about 0.2%, based on the weight of the total composition, constitutes the operating minimum content of anti-flocculating agent. Extensive tests have shown the optimum concentration to be about 0.5%. More than 0.5% may be used, but produces no significantly greater improvement in properties.

Although the above examples were all formulated with ¼ second cellulose nitrate in the vehicle, any cellulose nitrate conventionally used in lacquer formulations may be used in the practice of this invention.

In addition to the blue and green pigments used in the above examples, other phthalocyanine pigments, which may be metal-free complexes, metal complexes (particularly copper), and chlorinated metal complexes, either as toners or laked phthalocyanines, may be used.

As shown in the above examples, the ethyl cellulose may be of the low (43-45%), medium (46-48%), or high (48-50%) ethoxyl content variety, but the low (43-45%) ethoxyl content type is preferred. The viscosity of the ethyl cellulose should be in the range of 40-400 centipoises, a viscosity of about 50 centipoises being preferred.

Although oil modified alkyd resins have been disclosed in the examples, they may be omitted or other suitable lacquer resins may be substituted for the alkyd resins where desired.

The above examples show the tinting of phthalocyanine pigmented lacquers with titanium dioxide pigmented lacquers. However, tinting lacquers containing other pigments, such as bone black, chrome yellow, hydrous iron oxide, and finely divided metallic aluminum, may be used to shade the phthalocyanine lacquers, or the phthalocyanine lacquers may be used in their unshaded form.

The malic acid shown in the above examples was included to prevent oil-spotting, as described in United States Patent No. 2,315,347, but it will be obvious that it may be omitted where resistance to oil-spotting is not necessary.

The products of this invention are free of the serious handicap encountered in the use of phthalocyanine pigments in prior lacquer formulations; i. e., rapid flocculation and striation, resulting in mottled appearance or non-uniform color. Avoidance of these objectionable properties is particularly desirable in the automotive finishing field, where color stability is a necessity. As previously mentioned, in large scale finishing operations these objectionable characteristics were circumvented to a certain extent by provision of adequate mixing. However, in small scale operations, where the product may be packaged in containers as small as half pints (for instance, in the refinish trade), adequate provision for mixing or recirculating is not always conveniently feasible or even possible. Furthermore, in this particular field, lacquers may be in shelf storage for periods ranging up to six months or longer and, consequently, if flocculation occurs, the originally color-matched material cannot be restored to matched quality by available simple means of agitation. The use of phthalocyanine pigments has therefore been avoided in many instances to prevent consumer complaints due to the flocculating tendency. The eliminating or retarding of this tendency to flocculate and settle paves the way for the more extensive use of phthalocyanine pigments.

The objects of this invention were accomplished without adverse effects resulting from the incorporation of the recited agents; for instance, exposure tests of representative finishes demonstrated that the weathering properties and durability, which are essential in an automotive finish, were not adversely affected by the presence of the anti-flocculating agent.

It is apparent that many widely different embodiments of this invention can be made without departing from the spirit and scope thereof; and, therefore, it is not intended to be limited except as indicated in the appended claims.

I claim:

1. A non-flocculating and non-striating lacquer comprising cellulose nitrate, a solvent therefor, a phthalocyanine pigment, and at least 0.2%, based on the total composition, of ethyl cellulose.

2. The lacquer of claim 1 in which the ethyl cellulose is present in an amount of about 0.5% based on the total composition.

3. The lacquer of claim 1 in which the ethyl cellulose has an ethoxyl content of about 43-45% and a viscosity of about 50 centipoises.

4. A non-flocculating and non-striating coating composition comprising, by weight, 95 parts of a blend of cellulose nitrate tinting lacquers, one of which is pigmented with a phthalocyanine, and 5 parts of a 10% ethyl cellulose solution.

5. The coating composition of claim 4 in which the ethyl cellulose has an ethoxyl content of about 43–45% and a viscosity of about 50 centipoises.

ROBERT TYLER HUCKS.

REFERENCES CITED

The following references are of record in the file of this patent:

UNITED STATES PATENTS

| Number | Name | Date |
|---|---|---|
| 1,885,475 | Persiel | Nov. 1, 1932 |
| 1,900,638 | Ellis | Mar. 7, 1933 |
| 2,062,137 | McKinney et al. | Nov. 24, 1936 |
| 2,170,187 | Clarke | Aug. 22, 1939 |
| 2,214,667 | Ensminger | Sept. 10, 1940 |
| 2,310,866 | Pitman | Feb. 9, 1943 |
| 2,310,867 | Pitman | Feb. 9, 1943 |
| 2,315,870 | Nadler | Apr. 6, 1943 |
| 2,413,011 | Traylor | Dec. 24, 1946 |

FOREIGN PATENTS

| Number | Country | Date |
|---|---|---|
| 435,614 | Great Britain | Sept. 16, 1935 |
| 47,557 | France | June 4, 1937 |
| 47,562 | France | June 4, 1937 |